US012719400B2

(12) United States Patent
Weissenborn et al.

(10) Patent No.: US 12,719,400 B2
(45) Date of Patent: Aug. 25, 2026

(54) CONTROL DEVICE FOR A DRIVE SYSTEM, DRIVE SYSTEM, METHOD

(71) Applicant: Robert Bosch GmbH, Stuttgart (DE)

(72) Inventors: Erik Weissenborn, Geratal Ot Gossel (DE); Marco Graf, Tamm (DE); Martin Hennen, Stuttgart (DE); Volker Gilgenbach, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 18/580,599

(22) PCT Filed: Jul. 13, 2022

(86) PCT No.: PCT/EP2022/069550
§ 371 (c)(1),
(2) Date: Jan. 18, 2024

(87) PCT Pub. No.: WO2023/006422
PCT Pub. Date: Feb. 2, 2023

(65) Prior Publication Data

US 2024/0322735 A1 Sep. 26, 2024

(30) Foreign Application Priority Data

Jul. 29, 2021 (DE) ..................... 10 2021 208 168.1

(51) Int. Cl.
*H02P 29/10* (2016.01)

(52) U.S. Cl.
CPC .................................... *H02P 29/10* (2016.02)

(58) Field of Classification Search
CPC .... H02P 29/10; H02P 3/18; H02P 3/22; H02P 29/025
See application file for complete search history.

(56) References Cited

U.S. PATENT DOCUMENTS 10,924,001 B2 2/2021 Li et al.
2009/0230897 A1* 9/2009 Coenen ..................... H02P 3/12 310/90.5

(Continued)

FOREIGN PATENT DOCUMENTS

DE 102011081173 A1 2/2013
DE 102019217834 A1 5/2021

(Continued)

OTHER PUBLICATIONS

Translation of International Search Report for Application No. PCT/EP2022/069550 dated Nov. 8, 2022 (3 pages).

(Continued)

*Primary Examiner* — Santosh R Poudel
(74) *Attorney, Agent, or Firm* — Michael Best & Friedrich LLP

(57) ABSTRACT

The invention relates to a control device (8) for a drive system (1) which has an electric motor (2) electrically connected by a power electronics unit (7) to an electrical power storage device (6), the control device (8) having a computing unit (12) and a plurality of gate driver circuits (13, 14) and being designed to set a safe operational state in the power electronics unit (7) when a fault in the drive system (1) and/or the control device (8) is detected. The computing unit (12) is designed to determine a control instruction in accordance with a current actual rotational speed ($n_{Ist}$) of the motor (2) and to store the control instruction in the gate driver circuits (13, 14), and the gate driver circuits (13, 14) set the safe operational state according to the stored control instruction when a fault is detected.

13 Claims, 5 Drawing Sheets

(56) References Cited

U.S. PATENT DOCUMENTS

| | | | | |
|---|---|---|---|---|
| 2014/0191700 | A1* | 7/2014 | Eberlein | B60L 3/0061 318/504 |
| 2015/0155817 | A1* | 6/2015 | Aldinger | H02P 27/06 318/400.27 |
| 2015/0214858 | A1* | 7/2015 | Raichle | H02M 7/537 363/131 |
| 2017/0301305 | A1* | 10/2017 | Gao | G09G 3/3696 |
| 2017/0313193 | A1* | 11/2017 | Grossmann | H02P 3/22 |
| 2019/0306014 | A1* | 10/2019 | Barrenscheen | G06F 13/4295 |
| 2020/0067400 | A1* | 2/2020 | Li | H02M 1/4216 |
| 2021/0210977 | A1* | 7/2021 | Nakamori | H02J 9/062 |

FOREIGN PATENT DOCUMENTS

| | | | |
|---|---|---|---|
| EP | 3203627 | A1 | 8/2017 |
| EP | 3687066 | A1 | 7/2020 |
| JP | 2004316502 | A * | 11/2004 |

OTHER PUBLICATIONS

Nouman et al., “FPGA usage for power inverters diagnostics,” 39th Annual Conference of the IEEE Industrial Electronics Society, 2013, 785-789.

* cited by examiner

CONTROL DEVICE FOR A DRIVE SYSTEM, DRIVE SYSTEM, METHOD

BACKGROUND

The invention relates to a control device for a drive system which has an electric motor electrically connected by a power electronics unit to an electric power storage device, the control device having a computing unit and a plurality of gate driver circuits and being designed to set a safe operational state in the power electronics unit when a fault in the drive system and/or the control device is detected.

In addition, the invention relates to a drive system having such a control device.

Further, the invention relates to a method for operating a drive system.

From the prior art, drive systems are known that comprise an electric motor that is electrically connected by a power electronics unit to an electric power storage device. Such electric drive systems are increasingly gaining importance, particularly in electrically driven motor vehicles. In such drive systems, there is typically a control device having a computing unit and a plurality of gate driver circuits to drive the power electronics unit.

For safety reasons, a safe operational state is typically set in the power electronics unit when a fault is detected in the drive system and/or the control device. Safe operational states are known to be, for example, an active short circuit or a so-called freewheel. In the event of an active short circuit, the phase terminals of the electric motor are electrically shorted using the switching elements in the power electronics unit. In the case of a freewheel, on the other hand, all switching elements of the power electronics unit are opened or non-counductingly switched.

The disclosure document DE 10 2011 081 173 A1 discloses a control device that sets the safe operational state as a function of a current actual rotational speed of the electric motor. The active short circuit is basically safe regardless of the actual rotational speed. However, the active short circuit at low actual rotational speeds has the disadvantage that the electric motor generates a high deceleration torque when switching to the active short circuit. This is usually undesirable. The freewheel is generally advantageous at low actual rotational speeds, but has the disadvantage at high actual rotational speeds that such high electrical voltages can be induced into the phases of the electric motor that a current flow from the electric motor results in the power storage device. Such a current flow and the resulting torque are undesirable.

In this respect, the disclosure publication DE 10 2011 081 173 A1 proposes to set the freewheel if the actual rotational speed falls below a predetermined threshold speed and the active short circuit if the actual rotational speed exceeds the threshold rotational speed.

SUMMARY

The control device according to the invention is characterized in that the computing unit is designed to determine a control instruction and store the control instruction in the gate driver circuits, as a function of the current actual rotational speed of the motor, and in that the gate driver circuits set the safe operational state according to the stored control instruction when a fault is detected. The current actual rotational speeds of the motor are typically determined by the computing unit. If the detected fault relates to the computing unit, the actual rotational speeds are accordingly no longer available and cannot be considered when deciding which safe operational state should be set. In previously known control devices, the active short circuit is therefore always set as a safe operational state when there is a fault in the computing unit. As mentioned above, however, the freewheel is preferred at least at low actual rotational speeds of the electric motor. Due to the design of the control device according to the invention, it is achieved that an advantageous selection of the safe operational state can also be made when there is a fault relating to the computing unit. According to the present invention, the computing unit is designed to determine the control instruction as a function of the current actual rotational speed and to store the determined control instruction in the gate driver circuits. If a fault affecting the computing unit now occurs, the gate driver circuits can access the stored control instruction independent of the computing unit and set the safe operational state according to the control instruction. Preferably the computing unit is designed as a microcontroller. The gate driver circuits are preferably each designed as an ASIC (Application Specific Integrated Circuit). According to the present invention, the computing unit stores the control instruction in the gate driver circuits. In this respect, the gate driver circuits each comprise a data storage device for storing the control instruction. The power electronics unit preferably had a plurality of half bridges corresponding to the plurality of phases of the electric motor, wherein each half bridge has at least one high-side switch and at least one low-side switch, respectively. Particularly preferably, the electric motor comprises three phases, such that the power electronics unit then comprises three half bridges and is thus designed as a B6 bridge. Preferably, the plurality of gate driver circuits corresponds to the plurality of switches of the power electronics unit. For example, if the power electronics are designed as a B6 bridge, the control device has six gate driver circuits, wherein each of the gate driver circuits is assigned to a different one of the switches of the power electronics unit. Preferably, the computing unit is designed to determine continuously updated control instructions and store them in the gate driver circuits. If an updated control instruction is stored in the gate driver circuits, a control instruction already stored in the gate driver circuits is preferably replaced by the updated control instruction.

According to a preferred embodiment, it is provided that the control instruction comprises information on whether the active short circuit or the freewheel in the power electronics unit is to be set as the safe operational state. Thus, in this embodiment of the method, the computing unit determines whether the active short circuit or the freewheel is to be set as the safe operational state as a function of the current actual rotational speed and accordingly defines the control instruction. For example, the computing unit determines at low actual rotational speeds that the freewheel is to be set. This results in the advantages associated with setting the freewheel.

According to a preferred embodiment, it is provided that the computing unit is designed to predict a maximum rotational speed that the motor can reach as a maximum within a predetermined first time interval, based on the current actual rotational speed, and determine the control instruction as a function of the predicted maximum rotational speed. Preferably, the computing unit compares the predicted maximum rotational speed with a predetermined threshold rotational speed. If the comparison determines that the maximum rotational speed is below the threshold rotational speed, the computing unit preferably determines that the freewheel is to be set as the safe operational state and determines the control instruction accordingly. However, if the comparison determines that the maximum rotational speed is above the threshold rotational speed, the computing unit preferably determines that the active short circuit is to be set as the safe operational state and determines the control instruction accordingly. Preferably, a time interval of 50 ms to 300 ms is provided as the first time interval, more preferably a time interval of 100 ms to 200 ms.

Preferably, the computing unit is designed to predict the maximum rotational speed as a function of a maximum torque of the electric motor and/or as a function of a mass of a motor vehicle comprising the drive system. These parameters are used to precisely predict the maximum rotational speed. The rotational speed range in which the freewheel is to be set substantially coincides with the base rotational speed range of the motor. In this respect, the maximum torque of the motor is preferably based on the maximum torque in the base rotational speed range. This procedure corresponds to a simplified worst case consideration. Alternatively, the maximum torque is preferably used as the basis for the maximum torque, which the motor can generate as a maximum at its current operating point.

According to a preferred embodiment, it is provided that the control instruction has a time period, that the gate driver circuits start the time period when the fault is detected and set the freewheel in the power electronics unit as a safe operational state, and that the gate driver circuits set the active short circuit in the power electronics unit as the safe operating state when the time period elapses, starting from the set freewheel. According to this embodiment, the computing unit thus determines the time period as a function of the current actual rotational speed. When the fault is detected, the freewheel is first set and the active short circuit is set when the time period has elapsed. This is based on the recognition that the freewheel is at least temporarily safe for the time period included in the control instruction, even at high actual rotational speeds. Preferably, the computing unit determines the time period such that, starting from the set freewheel, the active short circuit is set before undesirably high electrical voltages are induced into the phases of the motor. Preferably, the time period is reduced with increasing actual rotational speeds.

According to a preferred embodiment, it is provided that the gate driver circuits each comprise a data storage device for storing the control instruction, and that the computing unit is communicatively connected to the data storage devices by bi-directional communication devices. Because the computing unit is connected to the data storage devices by bi-directional communication devices, the computing unit may check whether the control instruction has been correctly stored in the gate driver circuits and the data storage devices of the gate driver circuits, respectively. Preferably, the bi-directional communication devices each comprise a data bus, in particular a UART bus. Preferably, the computing unit is designed to secure the control instruction via end-to-end protection with message counter and/or checksum. If a fault in the storage of the control instruction is detected, preferably after a predetermined debounce time has elapsed, the computing unit initiates a safety reaction, for example a warning message or a reduction in the power of the electric motor.

Preferably, the gate driver circuits each comprise a safety logic unit for monitoring the computing unit. If there is a fault relating to the computing unit, this fault is thus detected by the gate driver circuits themselves.

According to a preferred embodiment, it is provided that the safety logic units are communicatively connected to an amplifier of the respective gate driver circuit by a respective safety control path. The amplifier, also referred to as a booster, is a unit designed to amplify an incoming control signal and to apply the amplified control signal to a control terminal of the assigned switch of the power electronics unit to switch the switch. Preferably, the safety logic units are communicatively connected to the data storage device of the respective gate driver circuit so that the safety logic units can access the control instruction stored in the data storage device.

The control device according to a preferred embodiment is provided in that the computing unit is communicatively connected to the amplifiers by a standard control path each, and that the safety control paths have higher prioritization than the standard control paths. The standard control paths are the control paths through which the computing unit applies pulse width modulated control signals to the amplifiers in faultless operation of the electric motor. Because the safety control paths have higher prioritization than the standard control paths, the control signals transmitted by the safety control paths are implemented by the amplifiers having a higher priority than the control signals transmitted by the standard control paths.

Preferably, the control device comprises a bi-directional safety communication network, wherein the safety communication network comprises a node point to which both the computing unit and the safety logic units are communicatively connected. The safety communication network is bi-directional. In this respect, the safety logic units and the computing unit are each connected to the node point by at least one bidirectional communication path. Through such a safety communication network, each of the safety logic units may monitor both the computing unit and the others of the safety logic units for faults. In addition, the computing unit may provide, by the safety communication network, information to the safety logic units regarding a fault detected by the computing unit.

Preferably, the gate driver circuits each have a low voltage side and a high voltage side; the high voltage sides each having a unit for internally monitoring the respective low voltage side. This results in the advantage that the gate driver circuits themselves can detect a fault that relates to its low voltage side. Preferably, the high voltage sides of the gate driver circuits have at least the portion of the safety logic units communicatively connected to the respective amplifier by the safety control path. Preferably, the high voltage sides of the gate driver circuits comprise the data storage device. The high voltage sides are powered by an electrical power source of a high voltage grid. Preferably, the power source is the power storage device that is electrically connected to the electric motor by the power electronics unit. The low voltage sides are powered by a power source of a low voltage grid. For example, the power source is a further electric power storage device whose nominal voltage is less than the nominal voltage of the power storage device electrically connected to the electric motor by the power electronics unit.

The electric drive system according to the invention comprises an electric motor being electrically connected to an electric power storage device by means of a power electronics unit. The drive system is characterized by means of the control device according to the invention for controlling the power electronics unit. This, too, results in the aforementioned advantages. Further preferred attributes and combinations of attributes result from the description and the claims.

The method according to the invention for operating an electric drive system, comprising an electric motor, electrically connected to an electric power storage device by a power electronics unit, and a control device for controlling the power electronics unit, wherein the control device comprises a computing unit and a plurality of gate driver circuits, characterized in that the computing unit determines a control instruction and stores the control instruction in the gate driver circuits as a function of a current actual rotational speed of the motor, and that the drive system is monitored for faults, and that the gate driver circuits set the safe operational state according to the saved control instruction when a fault is detected. This, too, results in the aforementioned advantages. Further preferred attributes and combinations of attributes result from the description and the claims.

According to a preferred embodiment of the method, it is provided that the control instruction comprises information on whether an active short circuit or a freewheel in the power electronics unit is to be set as a safe operational state, that the computing unit predicts a maximum rotational speed which the motor can reach as a maximum within a predetermined first time interval based on the current actual rotational speed, and the control instruction determines, as a function of the predicted maximum speed, that when a fault affecting the computing unit is detected, a second time interval is started which is shorter than the first time interval, and that the gate driver circuits program the active short circuit as a safe operational state after the second time interval has elapsed. For example, a time interval of 20 to 250 ms is provided as the second time interval. The computing unit predicts the maximum speed that the motor can achieve based on the current actual rotational speed within the first time interval and determines the control instruction based on this maximum speed. However, in certain situations, such as when the motor vehicle having the drive system accelerates down a slope, the speed of the motor may continue to increase. In this case, it is undesirable that an originally set freewheel be maintained. If the fault does not relate to the computing unit, the computing unit can continue to monitor the actual rotational speed and, if necessary, set the active short circuit. However, if the fault relates to the computing unit, this possibility is not given. In this case, to avoid a current flow from the motor to the power storage device, it is advantageous for the active short circuit to be programmed or set as a safe operational state after the end of the second time interval.

BRIEF DESCRIPTION OF THE DRAWINGS

The invention is explained in more detail below with reference to the drawings. The figures show.

DETAILED DESCRIPTION

Figure 1:
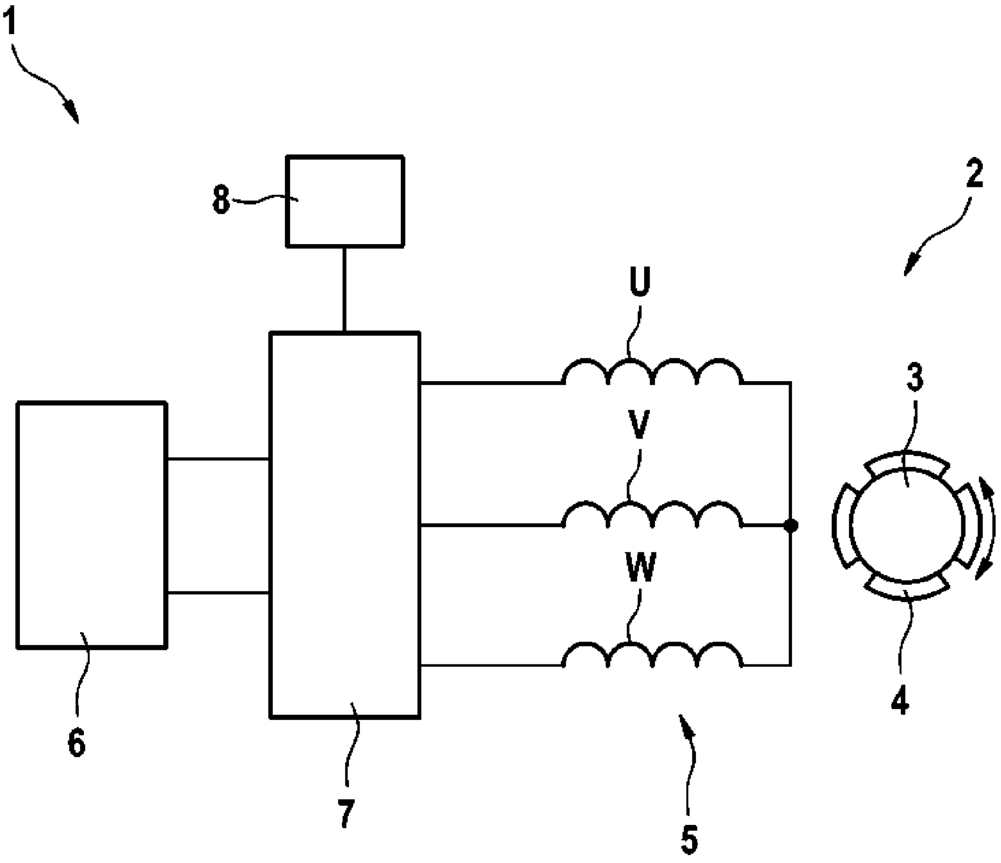
FIG. 1 a drive system.

FIG. 1 shows a drive system 1 of a motor vehicle (not shown in further detail) in a simplified representation. The drive system 1 comprises an electric motor 2. The electric motor 2 comprises a rotatably mounted rotor 3, on which a plurality of permanent magnets 4 are arranged in a rotationally fixed manner. The electric motor 2 also comprises a motor winding 5 with three phases U, V, and W in the present case. The motor winding 5 is arranged around the rotor 3 in such a way that the rotor 3 is rotatable by a suitable energization of the phases U, V, and W.

The drive system 1 also comprises an electric power storage device 6. The motor winding 5 is electrically connected to the power storage device 6 by a power electronics unit 7 of the drive system 1. The power electronics unit 7 in the present case has a plurality of half bridges corresponding to the plurality of phases U, V, and W, each of which has at least one low-side switch and at least one high-side switch. Accordingly, the power electronics unit in the present case comprise three half bridges.

The drive system 1 also comprises a control device 8. The control device 8 is designed to control or switch the switches of the power electronics unit 7. The specific design of the control device 8 will be explained in more detail below with reference to FIG. 2.

Figure 2:
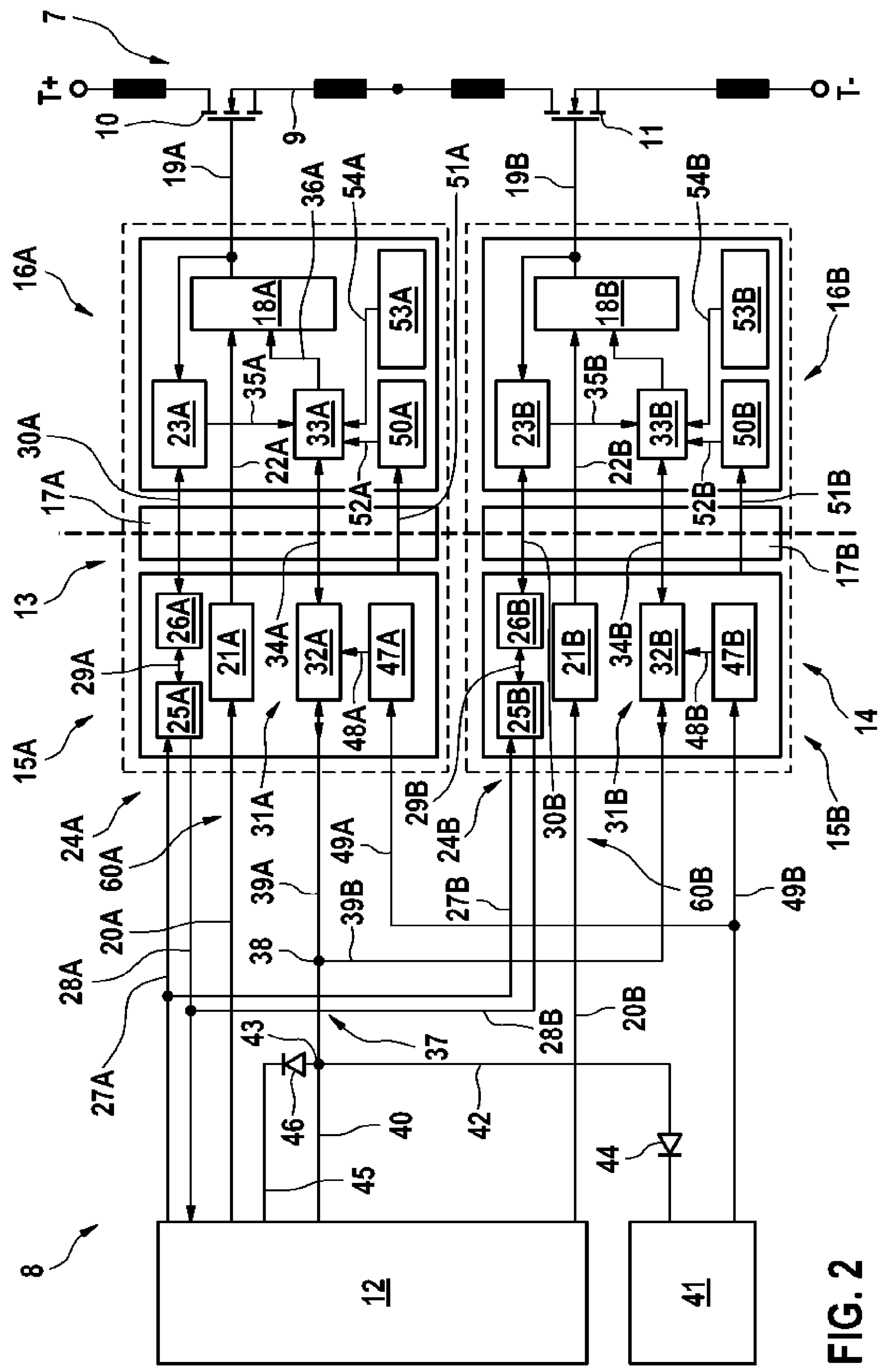
FIG. 2 a control device of the drive system.

On the right edge of FIG. 2, a half bridge 9 of the power electronics unit 7 is shown. As can be seen from FIG. 2, the half bridge 9 comprises a high-side switch 10 and a low-side switch 11. The remaining two half bridges correspond in terms of their design to the half bridge 9 shown in FIG. 2.

The control device 8 comprises a computing unit 12. The computing unit 12 is in the present case designed as a microcontroller 12.

The control device 8 also has a plurality of gate driver circuits corresponding to the plurality of switches of the power electronics unit 7, wherein each of the switches is assigned to a different one of the gate driver circuits. The gate driver circuits are each designed as an ASIC. Only two of the gate driver circuits are shown in FIG. 2, namely a first gate driver circuit 13 assigned to the high-side switch 10, and a second gate driver circuit 14 assigned to the low-side switch 11. In addition to the gate driver circuits 13 and 14, there are further gate driver circuits assigned to the switches of the half bridges of the power electronics unit 7 not shown in FIG. 2.

The following explains the design of the first gate driver circuit 13. However, the gate driver circuits are substantially the same with respect to their design features. In particular, the gate driver circuits differ only in that their configuration is adapted to the switch they control. Constructive features disclosed with regard to the first gate driver circuit 13 are thus also realized in the other gate driver circuits.

The first gate driver circuit 13 has a low voltage side 15A and a high voltage side 16A. A potential barrier 17A is arranged between the low voltage side 15A and the high voltage side 16A.

The high voltage side 16A has an amplifier 18A. The amplifier 18A is electrically connected to a control terminal of the high-side switch 10 by a control path 19A.

The computing unit 12 is communicatively connected to the amplifier 18A by a standard control path 60A. The standard control path 60A has a first standard control path 20A through which the computing unit 12 is communicatively connected to a GTR logic unit 21A of the low voltage side 15A. The standard control path 60A has a second standard control path 22A through which the GTR logic unit 21A is communicatively connected to the amplifier 18A. The computing unit 12 applies pulse width modulated control signals to the amplifier 18A during operation of the drive system 1 by means of the standard control path 60A. The amplifier 18A amplifies the pulse width modulated control signals and applies the amplified pulse width modulated control signals to the control terminal of the high-side switch 10 to switch the high-side switch 10.

The high voltage side 16A also includes a data storage device 23A. The computing unit 12 is communicatively connected to the data storage device 23A by a bi-directional communication device 24A. In the present case, the bi-directional communication device 24A comprises a data bus 25A and a buffer 26A. The data bus 25A and the buffer 26A are part of the low voltage side 15A. The computing unit 12 is communicatively connected to the data bus 25A by two communication paths 27A, 28A of the communication device 24A. The data bus 25A is also communicatively connected to the buffer 26A by a bi-directional communication path 29A. The buffer 26A is also communicatively connected to the data storage device 23A by a bi-directional communication path 30A.

The first gate driver circuit 13 also includes a safety logic unit 31A. The safety logic unit 31A has a low voltage side portion 32A and a high voltage side portion 33A. The low voltage side portion 32A and the high voltage side portion 33A are communicatively connected to each other by a bidirectional communication path 34A. The high voltage side portion 33A is also communicatively connected to data storage device 23A by a communication path 35A. In addition, the high voltage side portion 33A is communicatively connected to the amplifier 18A by a safety control path 36A. The safety control path 36A has higher prioritization than the standard control path 60A.

The control device 8 also comprises a bi-directional safety communication network 37. The safety communication network 37 has a node point 38. The low voltage side portion 33A of the safety logic unit 31A of the gate driver circuit 13 is communicatively connected to node point 38 by a bidirectional communication path 39A. The low voltage side portions of the safety logic units of the other gate driver circuits are also each communicatively connected to node point 38 by a bidirectional communication path 39. The computing unit 12 is communicatively connected to the node point 38 by a bi-directional communication path 40.

The control device 8 also comprises a watchdog unit 41. Watchdog units are known in the prior art and are used to trigger a reset of the microcontroller in the event of a program crash of a microcontroller. The watchdog unit 41 is connected to a node point 43 of the communication path 40 by a communication path 42. The communication path 42 comprises a diode 44 conducting towards the watchdog unit 41. The node point 43 is also connected to the computing unit 12 by a communication path 45. The communication path 45 comprises a diode 46 conducting towards the computing unit 12.

The low voltage side 15A also comprises a power supply monitoring unit 47A. The power supply monitoring unit 47A is communicatively connected to the low voltage side portion 32A of the safety logic unit 31A by a bidirectional communication path 48A. In addition, the power supply monitoring unit 47A is communicatively connected to the watchdog unit 41 by a supply path 49A.

The high voltage side 16A has a unit 50A for internally monitoring the low voltage side 15A. The unit 50A is communicatively connected to the low voltage side 15A by a communication path 51A. In addition, the unit 50A is communicatively connected to the high voltage side portion 33A of the safety logic unit 31A by a communication path 52A.

The high voltage side 16A also comprises an OTP unit 53A. An OTP unit is a programmable electronic component having a non-volatile data storage device that can only be written to once. The OTP unit 53A is communicatively connected to the high voltage side portion 33A of the safety logic unit 31A by a communication path 54A.

Figure 3:
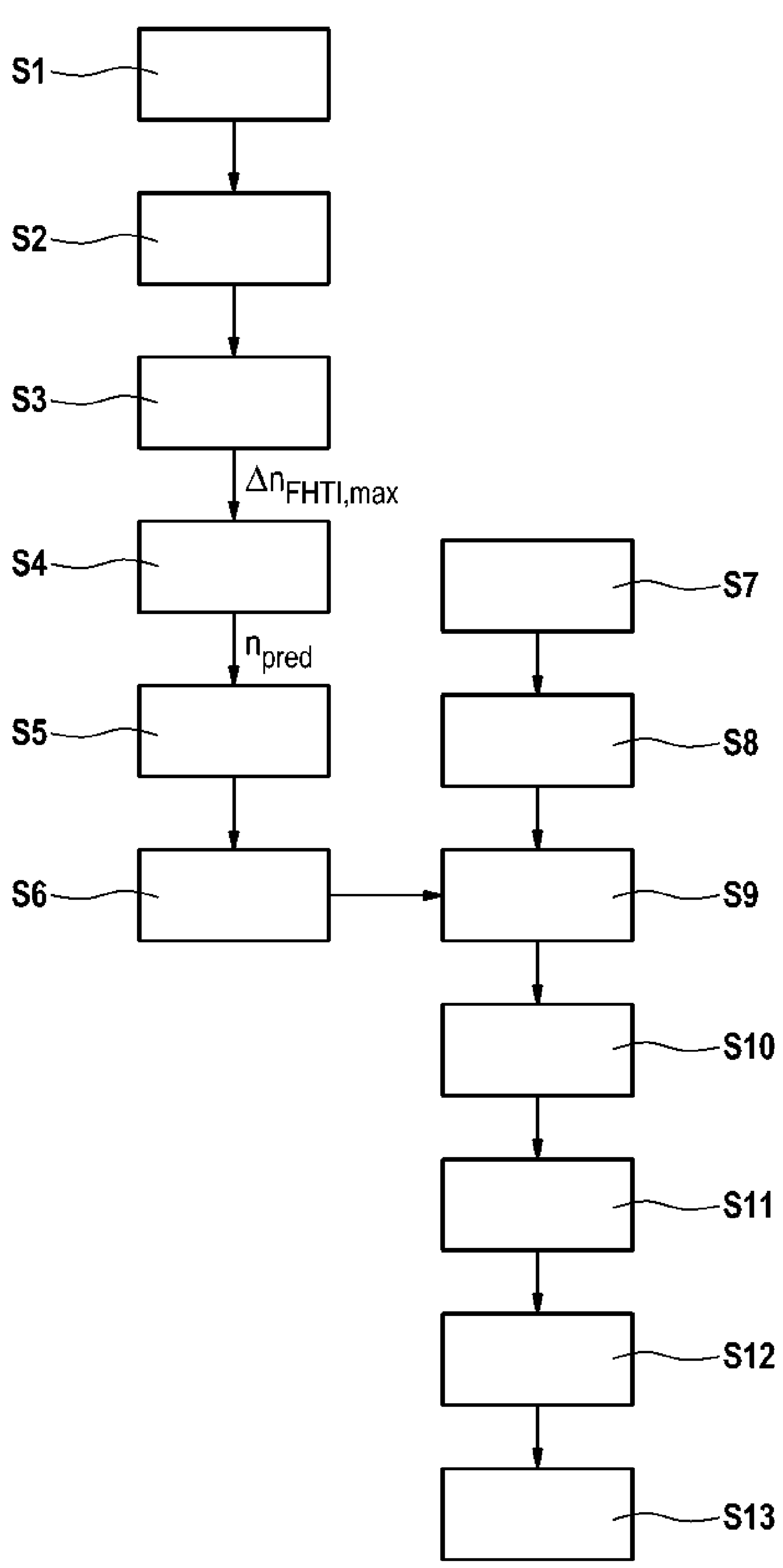
FIG. 3 a method for operating the drive system.
Figure 4:
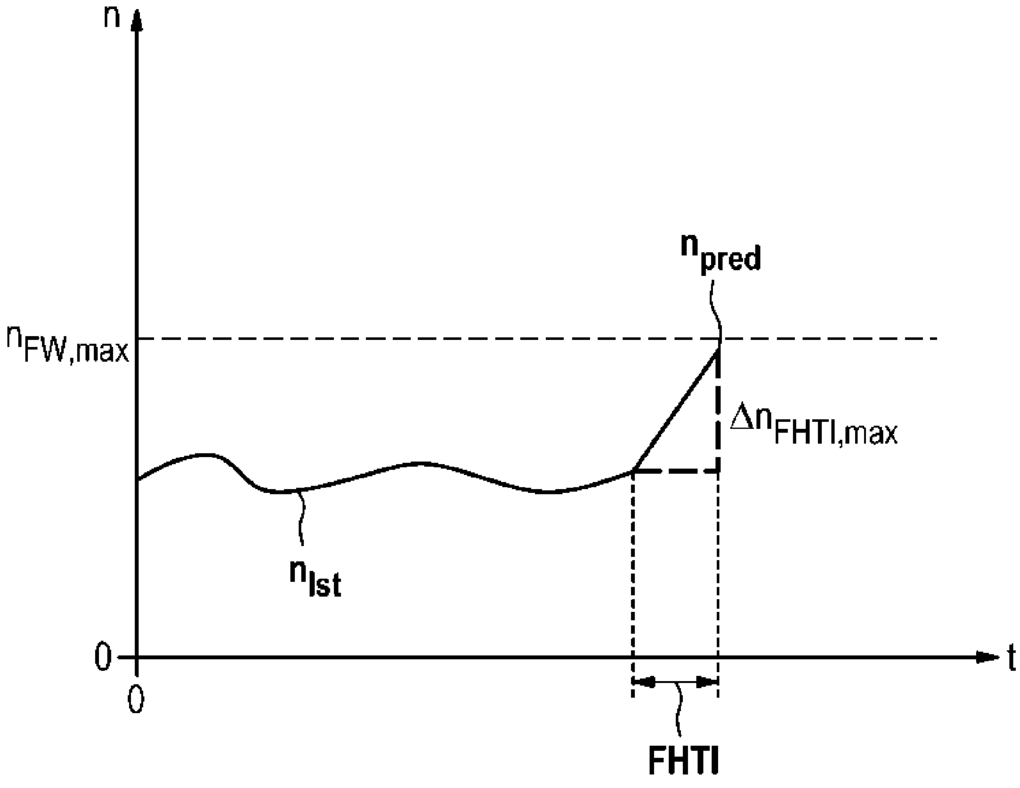
FIG. 4 partial aspects of the method.

Referring now to FIGS. 3 and 4, an advantageous method for operating the drive system 1 will be explained in greater detail. For this purpose, FIG. 3 shows the method using a flow chart. FIG. 4 shows partial aspects of the method using a diagram. It is assumed that the electric motor 2 is at least initially in operation. The motor winding 5 is thus powered such that the rotor 3 rotates to generate a torque.

In a first step S1, the computing unit 12 continuously determines the current actual rotational speed $n_{Ist}$ of the rotor 3 of the electric motor 2. For example, the computing unit 12 determines the actual rotational speed $n_{Ist}$ depending on a sensor signal of a rotation angle sensor assigned to the rotor 3.

In a second step S2, the computing unit 12 determines a maximum possible rotational speed gradient $\Delta n_{FHTI,max}$ as a function of a predetermined first time interval FHTI. The speed gradient $\Delta n_{FHTI,max}$ is the rotational speed interval by which the actual rotational speed $n_{Ist}$ of the electric motor 2 can be increased at most during the first time interval FHTI.

In the present case, the computing unit 12 determines the rotational speed gradient $\Delta n_{FHTI,max}$ using the formula F=m*a, wherein $m_{Fhzg}$ describes the mass of the motor vehicle, and wherein $M_{max,EM}$ describes the maximum torque of the electric motor 2 in the base rotational speed range:

$$F_{max,Rad} = \frac{M_{max,Rad}}{r_{Rad}} \text{ and } a_{max,Fhzg} = \frac{M_{max,EM} * i}{r_{Rad} * m_{Fhzg}}$$

result from the kinematic relationship $$a_{Fhzg} = r_{Rad}\frac{d\omega_{rad}}{dt} = 2\pi r_{Rad} = \frac{df_{Rad}}{dt} = \frac{2\pi r_{Rad}}{i} * \frac{df_{EM}}{dt}.$$

The change in the frequency of the motor 2 is linearly approximated according to $$\frac{df_{EM}}{dt} \approx \frac{\Delta n_{FHTI,max}}{FHTI}.$$

Thus, the maximum possible rotational speed gradient $\Delta n_{FHTI,max}$ can be determined using the following formulas:

$$a_{max,Fhzg} = \frac{2\pi r_{Rad}}{i} * \frac{\Delta n_{FHTI,max}}{FHTI}$$

$$\Delta n_{FHTI,max} = \frac{a_{max,Fhzg} * i * FHTI}{2\pi r_{Rad}}$$

In a third step S3, the computing unit 12 predicts a maximum rotational speed $n_{pred}$, which the motor 2 can reach as a maximum until the first time interval FHTI elapses. For this purpose, the computing unit 12 calculates the sum of the current actual rotational speed $n_{Ist}$ and the rotational speed gradient $\Delta n_{FHTI,max}$. Step S3 is also carried out continuously.

In a fourth step S4, the computing unit 12 compares the predicted maximum rotational speed $n_{pred}$ with a predetermined threshold rotational speed $n_{FW,max}$.

In a fifth step S5, the computing unit 12 determines a control instruction. The control instruction contains information as to whether an active short circuit or a freewheel in the power electronics unit 7 should be set as the safe operational state in the event of a fault in the drive system 1. If the comparison in step S4 determines that the maximum rotational speed $n_{pred}$ is below the threshold rotational speed $n_{FW,max}$, the computing unit 12 determines that the freewheel is to be set as the safe operational state and determines the control instruction accordingly. However, if the comparison determines that the maximum rotational speed $n_{pred}$ is above the threshold rotational speed $n_{FW,max}$, the computing unit 12 determines that the active short circuit is to be set as the safe operational state and determines the control instruction accordingly.

In a sixth step S6, the computing unit 12 stores the determined control instruction in the data storage device 23 using the bi-directional communication devices 24. The transmission of the control instruction is secured via end-to-end protection with message counter and checksum. In addition, the computing unit 12 checks whether the control instruction has been stored correctly in the data storage device 23. If a fault with regard to the storage of the control instruction is detected by the computing unit 12, the computing unit 12 initiates a suitable safety reaction, for example a warning message or a reduction in the power of the electric motor, after a debounce period has elapsed.

Steps S5 and S6 are also carried out continuously so that continuously updated control instructions are determined and stored in the data storage devices 23.

In a seventh step S7, the control device 8 monitors the drive system 1 for faults. The monitoring is performed by various elements of the control device 8.

For example, the computing unit 12 monitors the phases U, V, and W and the power electronics unit 7 for faults.

The low voltage side portions 32 of the safety logic units 31 monitor the computing unit 12, the watchdog unit 41, and the other gate driver circuits, respectively, for faults via the safety communication network 37. For example, the low voltage side portions 32 detect a fault in one of the aforementioned elements when the relevant element provides an unexpected signal via the safety communication network 37 or when an expected signal of the relevant element is absent.

The low voltage side portions 32 also monitor the power supply monitoring units 47 for faults. For example, the low voltage side portion 32A detects a fault in the voltage monitoring unit 47A when the voltage monitoring unit 47A provides an unexpected signal using communication path 48A, or when an expected signal is absent.

The units 50 monitor the low voltage sides 15 for faults. For example, the unit 50A detects a fault in the low voltage side 15A when the low voltage side 50A provides an unexpected signal using the communication path 51A, or when an expected signal is absent.

If a fault is detected in step S7, information regarding the detection of the fault is provided to the high voltage side portions 33 of the safety logic units 31 in a step S8.

The high voltage side portions 33 then retrieve the currently stored control instruction in the data storage devices 23 in a step S9.

In a tenth step S10, the high voltage side portions 33 control the amplifiers 18 by means of the safety control lines 36 such that the safe operational state is set according to the retrieved control instruction in the power electronics unit 7.

If the fault detected in step S7 relates to the computing unit 12, the safety logic units 31 start a predetermined second time interval in an eleventh step S11. For example, the safety logic units 31 start the second time interval with detection of the fault relating to the computing unit 12. The second time interval is shorter than the first time interval. For example, the second time interval is 20 ms to 250 ms.

In a twelfth step S12, the high voltage side portions 33 of the safety logic units 31 retrieve a second control instruction stored in the OTP units 53. The second control instruction contains information on how to switch the switch driven by the respective gate driver circuit so that the active short circuit is set in the power electronics unit 7.

At the end of the second time interval, the high voltage side portions 33 of the safety logic units 31 control the amplifiers 18 by means of the safety control lines 36 in a thirteenth step S13 according to the second control instruction. If the freewheel was set in step S10, then the active short circuit in power electronics unit 7 is set in step S13 starting from the freewheel.

Figure 5:
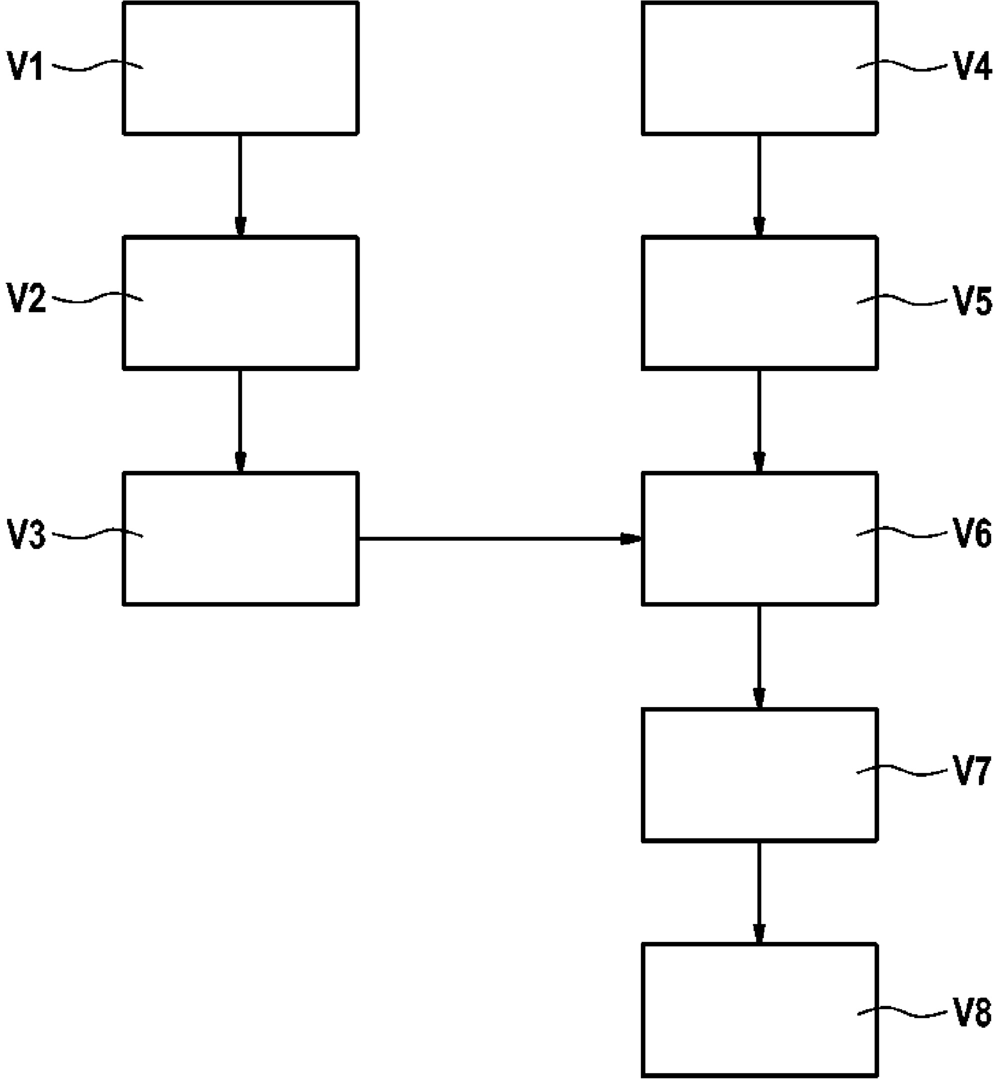
FIG. 5 a further method for operating the drive system.

FIG. 5 shows a further method for operating the drive system 1.

In a first step V1, the computing unit 12 continuously determines the current actual rotational speed $n_{Ist}$ of the rotor 3 of the electric motor 2. This step V1 corresponds to step S1 of the method shown in FIG. 3.

In a second step V2, the computing unit 12 determines a control instruction having a time period. The computing unit 12 determines the time period as a function of the current actual rotational speed $n_{Ist}$. Preferably, the time period is reduced when the actual rotational speed $n_{Ist}$ is increased.

In a sixth step V3, the computing unit 12 stores the determined control instruction in the data storage device 23 using the bi-directional communication devices 24. This step V3 corresponds to step S6 of the method shown in FIG. 3.

Steps V4 to V6 correspond to steps S7 to S9 of the exemplary embodiment shown in FIG. 3. With regard to these steps V4 to V6, reference is made to the corresponding text passages above.

In a seventh step V7, the high voltage side portions 33 control the amplifiers 18 by means of the safety control lines 36 such that the freewheel in the power electronics unit 7 is set as a safe operational state. In addition, the safety logic units 31 in the seventh step V7 start the time period included in the retrieved control instruction.

In an eighth step V8, the high voltage side portions 33 control the amplifiers 18 by means of the safety control lines 36 such that the active short circuit in the power electronics unit 7 is set starting from the initially set freewheel.

The invention claimed is:

1. A control device for a drive system (1) which has an electric motor (2) electrically connected by a power electronics unit (7) to an electric power storage device (6), the control device (8) comprising:

a computing unit (12) and a plurality of gate driver circuits (13, 14) and being configured to set a safe operational state in the power electronics unit (7) wherein that the computing unit (12) is configured to determine a control instruction in accordance with a current actual rotational speed ($n_{Ist}$) of the motor (2) and to store the control instruction in the gate driver circuits (13, 14) and that the gate driver circuits (13, 14) set the safe operational state according to the stored control instruction when a fault in the drive system (1) and/or the control device (8) is detected, wherein the computing unit (12) is configured to predict a maximum rotational speed ($n_{pred}$) which the motor (2) can reach as a maximum from the current actual rotational speed ($n_{Ist}$) within a predetermined first time interval (FHTI) and determine the control instruction as a function of the predicted maximum rotational speed ($n_{pred}$), and wherein the predetermined first time interval (FHTI) is between 50 ms and 300 ms.

2. The control device according to claim 1, wherein the control instruction comprises information on whether an active short circuit or a freewheel is to be set as the safe operational state in the power electronics unit (7).

3. The control device according to claim 1, wherein the computing unit (12) is configured to predict the maximum speed ($n_{pred}$) as a function of a maximum rotational torque ($M_{max,EM}$) of the motor (2) and/or as a function of a mass ($m_{Fhzg}$) of a motor vehicle comprising the drive system (1).

4. The control device according to claim 1, wherein the control instruction has a time period, that the gate driver circuits (13, 14) start the time period when the fault is detected and set a freewheel in the power electronics unit (7) as a safe operational state, and that the gate driver circuits (13, 14) set an active short circuit in the power electronics unit (7) as the safe operational state when the time period expires, starting from the set freewheel.

5. The control device according to claim 1, wherein the gate driver circuits (13, 14) each comprise a data storage device (23) for storing the control instruction, and that the computing unit (12) is communicatively connected to the data storage devices (23) by bi-directional communication devices (24).

6. The control device according to claim 1, wherein that the gate driver circuits (13, 14) each comprise a safety logic unit (31) for monitoring the computing unit (12).

7. The control device of claim 6, wherein the safety logic units (31) are each communicatively connected to an amplifier (18) of the respective gate driver circuit (13, 14) by a safety control path (36).

8. The control device according to claim 7, wherein the computing unit (12) is communicatively connected to the amplifiers (18) by a standard control path (60) each, and that the safety control paths (36) have higher prioritization than the standard control paths (60).

9. A control device according to claim 6, wherein a bi-directional safety communication network (37) having a node point (38) to which both the computing unit (12) and the safety logic units (31) are communicatively connected.

10. The control device according to claim 1, wherein the gate driver circuits (13, 14) each comprise a low voltage side (15) and a high voltage side (16).

11. An electrical drive system comprising an electrical motor (2) electrically connected by a power electronics unit (7) to an electric power storage device (6), further comprising a control device (8) having:

a computing unit (12) and a plurality of gate driver circuits (13, 14) and being configured to set a safe operational state in the power electronics unit (7) when a fault in the drive system (1) and/or the control device (8) is detected, wherein that the computing unit (12) is configured to determine a control instruction in accordance with a current actual rotational speed ($n_{Ist}$) of the motor (2) and to store the control instruction in the gate driver circuits (13, 14) and that the gate driver circuits (13, 14) set the safe operational state according to the stored control instruction when a fault is detected, wherein the computing unit (12) is configured to predict a maximum rotational speed ($n_{pred}$) which the motor (2) can reach as a maximum from the current actual rotational speed ($n_{Ist}$) within a predetermined first time interval (FHTI) and determine the control instruction as a function of the predicted maximum rotational speed ($n_{pred}$), and wherein the predetermined first time interval (FHTI) is between 50 ms and 300 ms.

12. A method for operating an electric drive system (1) which has an electric motor (2) electrically connected by a power electronics unit (7) to an electric power storage device (6), and a control device (8) for controlling the power electronics unit (7), wherein the control device (8) comprises a computing unit (12) and a plurality of gate driver circuits (13, 14), wherein the computing unit (12) determines a control instruction as a function of a current actual rotational speed ($n_{Ist}$) of the motor (2) and stores it in the gate driver circuits (13, 14), wherein the drive system (1) is monitored for faults, wherein the gate driver circuits (13, 14) set a safe operational state according to a saved control instruction when a fault is detected, and wherein the computing unit (12) is configured to predict a maximum rotational speed ($n_{pred}$) which the motor (2) can reach as a maximum from the current actual rotational speed ($n_{Ist}$) within a predetermined first time interval (FHTI) and determine the control instruction as a function of the predicted maximum rotational speed ($n_{pred}$), and wherein the predetermined first time interval (FHTI) is between 50 ms and 300 ms.

13. The method according to claim 12, wherein the control instruction has information on whether an active short circuit or a freewheel in the power electronics unit (7) is to be set as a safe operational state, that the computing unit (12) predicts a maximum rotational speed ($n_{pred}$) which the motor (2) can reach as a maximum from the current actual rotational speed ($n_{Ist}$) within a predetermined first time interval (FHTI), and the control instruction determines as a function of the predicted maximum speed ($n_{pred}$) that a second time interval shorter than the first time interval (FHTI) is started when a fault affecting the computing unit (12) is detected, and that the gate driver circuits (13, 14) program the active short circuit as a safe operational state after the second time interval has elapsed.

* * * * *